United States Patent
Cooper et al.

(10) Patent No.: US 7,805,850 B1
(45) Date of Patent: Oct. 5, 2010

(54) EXTENDABLE EDGE REFERENCE TOOL

(75) Inventors: Edward Cooper, Lafayette, CA (US);
Jeff Hayashida, San Jose, CA (US);
Andrew Butler, Palo Alto, CA (US);
David Titzler, Palo Alto, CA (US);
Brian Lamb, San Francisco, CA (US);
John Johnston, Redwood City, CA (US); Christopher Tacklind, Palo Alto, CA (US)

(73) Assignee: Design to Manufacturing, Inc., Mountain View, CA (US)

( * ) Notice: Subject to any disclaimer, the term of this patent is extended or adjusted under 35 U.S.C. 154(b) by 0 days.

(21) Appl. No.: 11/556,569

(22) Filed: Nov. 3, 2006

Related U.S. Application Data

(60) Provisional application No. 60/733,897, filed on Nov. 4, 2005.

(51) Int. Cl.
*B43L 7/10* (2006.01)
(52) U.S. Cl. .............................. 33/374; 33/376; 33/495; 33/499; 33/478
(58) Field of Classification Search .................. 33/374, 33/376, 452, 459, 464, 484, 490, 491, 495–500, 33/809, 478, 465, 469, 474, 475, 458; 403/348–350, 403/353, 325; 292/113, 247, 248, DIG. 8
See application file for complete search history.

(56) References Cited

U.S. PATENT DOCUMENTS

| | | | | |
|---|---|---|---|---|
| 224,201 A * | 2/1880 | Derickson | ..................... | 223/31 |
| 747,850 A * | 12/1903 | Bihlman | ..................... | 33/376 |
| 845,291 A * | 2/1907 | Breckenridge | ............. | 403/321 |
| 958,349 A * | 5/1910 | Andersen | ..................... | 33/374 |
| 1,024,054 A * | 4/1912 | Barnes | ..................... | 292/247 |
| 1,094,651 A * | 4/1914 | Hayden | ..................... | 33/376 |
| 1,132,318 A * | 3/1915 | Feder | ..................... | 403/341 |
| 1,205,946 A * | 11/1916 | Lyons | ..................... | 33/376 |
| 1,261,658 A * | 4/1918 | Waller | ..................... | 33/374 |
| 1,430,904 A * | 10/1922 | Hunter | ..................... | 33/374 |
| 1,462,231 A * | 7/1923 | Fouse | ..................... | 403/102 |
| 1,605,604 A * | 11/1926 | Nerbon | ..................... | 33/376 |
| 1,655,766 A * | 1/1928 | Hildebrant | ............. | 403/340 |
| 2,879,606 A * | 3/1959 | Olivere | ..................... | 33/374 |
| 5,388,338 A * | 2/1995 | Majors | ..................... | 33/376 |
| 5,433,011 A * | 7/1995 | Scarborough et al. | ......... | 33/376 |
| 5,819,427 A * | 10/1998 | Rohweder | ..................... | 33/478 |
| 6,560,885 B1 * | 5/2003 | Cosentino | ..................... | 33/374 |
| 6,807,743 B2 * | 10/2004 | Odachowski | ............... | 33/465 |
| 2009/0139104 A1 * | 6/2009 | Rohweder | ..................... | 33/478 |

* cited by examiner

*Primary Examiner*—Amy Cohen Johnson
(74) *Attorney, Agent, or Firm*—Jeffrey Schox

(57) ABSTRACT

An extendable edge reference tool is disclosed. A first segment having a extending end and a receptacle end is provided. The receptacle end includes a coupling mechanism for joining a second segment using an over-center locking force to secure said second segment to said first segment. This tool provides for a useful continuous reference edge over extended distances through adjoining segments. Each segment is suitably compact to be easy stowed. The segments are useful individually. The segments can be joined to extend tool to lengths useful in common construction tasks.

19 Claims, 8 Drawing Sheets

US 7,805,850 B1

EXTENDABLE EDGE REFERENCE TOOL

CROSS REFERENCE TO RELATED APPLICATION

This application claims priority to Provisional Application Ser. No. 60/733,897, filed on Nov. 3, 2005.

FIELD OF THE DISCLOSURE

The present disclosure relates generally to measurement tools, and in particular to reference tools.

BACKGROUND

Construction and building tasks often require a suitable reference for establishing flatness, linearity or a common relationship of surface features. As examples among many different applications, a carpenter may use a linear reference tool to establish highpoints while planing a surface, or an installer may use a similar reference to establish low spots while finishing a wall. Typical extending straight edge tools are limited in length or do not create a continuous reference edge, and include a level. Levels are often used due to their straightness and finished edges, but the level function is not critical to many applications and including the level in a straight edge increases the tool cost.

DETAILED DESCRIPTION

Embodiments of the present invention described in the following detailed description are directed at virtual agents. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 7:
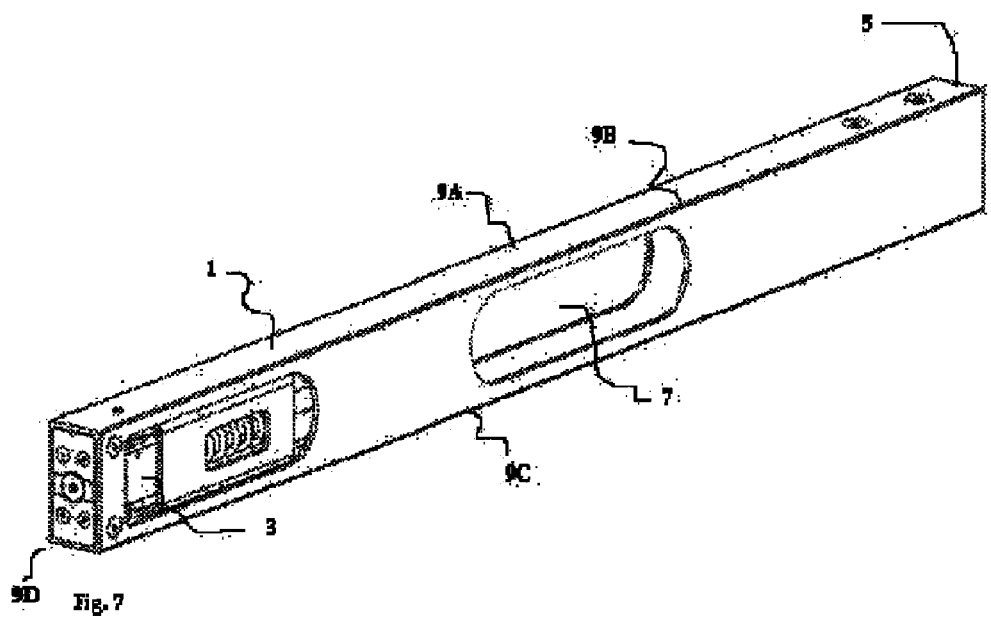
FIG. 7 shows one embodiment of segment assembly in accordance with this disclosure.

FIG. 7 shows an oblique view of one embodiment of an extendable edge reference 1 in accordance with this disclosure. A segment assembly 1 has edges 9A, 9B, 9C and 9D providing a useful linear reference. An extending coupling mechanism 3 is positioned at one end of the segment 1. A receiving feature 5 is positioned at the opposite end of the segment 1. Various features may be disposed in an area 7 for the attachment of accessories. Such features may include, but are not limited to cutouts, as shown, but could include characteristics of segment section profiles, inclusion of fastening elements, or a variety of suitable means. The segment assembly could be a variety of sizes. In a preferred embodiment the segment 1 is by 4' long, with the section common to 2×4 lumber.

Figure 6:
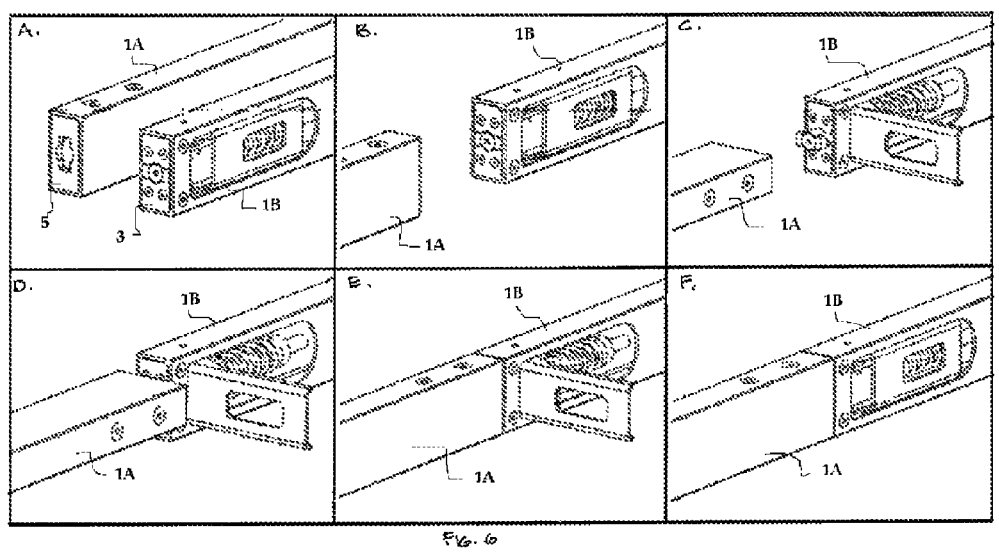
FIG. 6 shows assembly sequence in series of partial oblique views in accordance with this disclosure.

FIG. 6 shows a sequence illustrating one method of attaching two segments as described by this embodiment. Though FIG. 6 illustrates one such joining method, it is contemplated that alternate means and sequences of joining segment assemblies may be employed.

FIG. 6A shows a partial oblique view of two segments, a first segment assembly 1A presenting the receptacle end 5, and a second segment assembly 1B presenting the extending end 3. FIG. 6B shows the two segments 1A, 1B aligned for joining.

FIG. 6C shows the second segment with extending coupling mechanism 3 deployed, and the first segment 1A rotated approximately 90° to align the receiving feature 5 with the T-Head protruding from the segment 1B. FIG. 6D shows the first segment 1A abutted to the second segment 1B.

FIG. 6E shows the first segment 1A rotated to align with the second segment 1B. In this embodiment, this action causes the extending coupling mechanism 3 of segment 1B to engage the receiving feature 5 of segment 1A.

FIG. 6F shows the extending coupling mechanism latched in segment assembly 1B.

Figure 1:
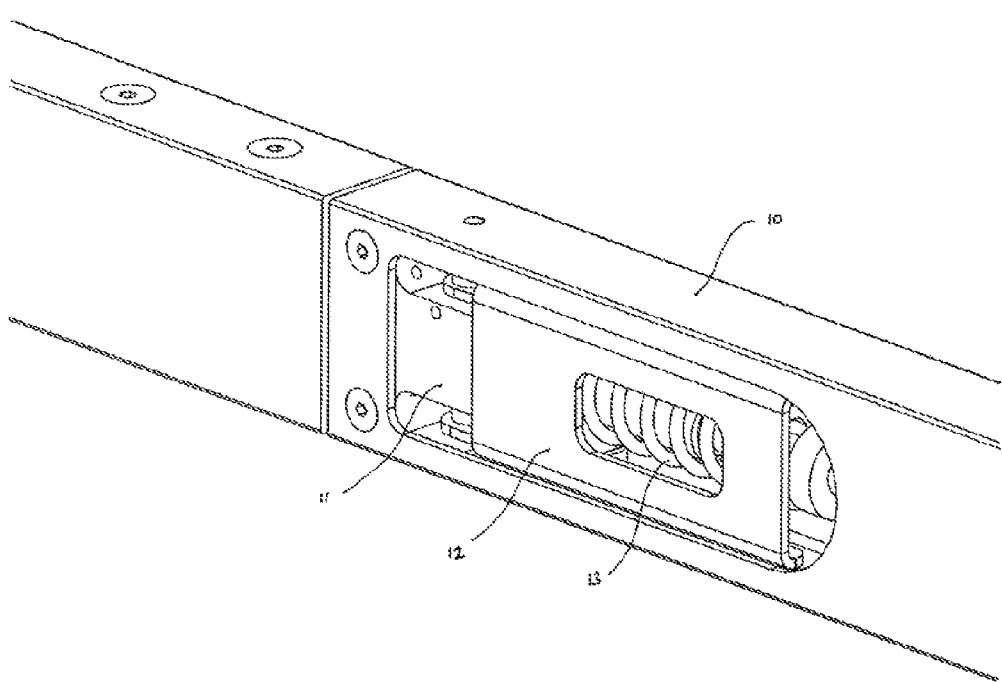
FIG. 1 shows a partial oblique view of two joined segments in accordance with this disclosure.
Figure 2:
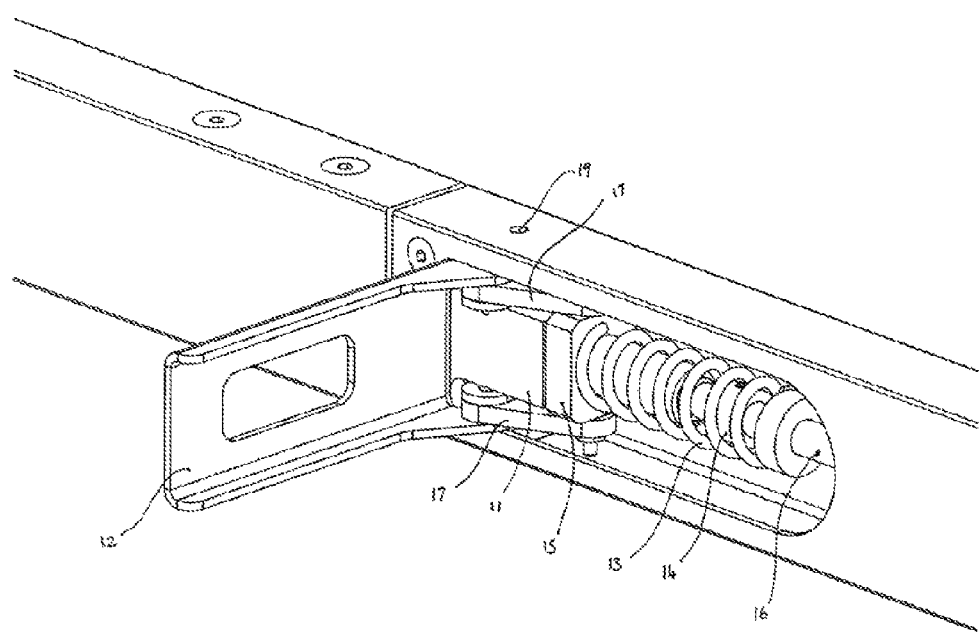
FIG. 2 shows a partial oblique view of two joined segments with handle open showing the clamping mechanism in accordance with this disclosure.
Figure 3:
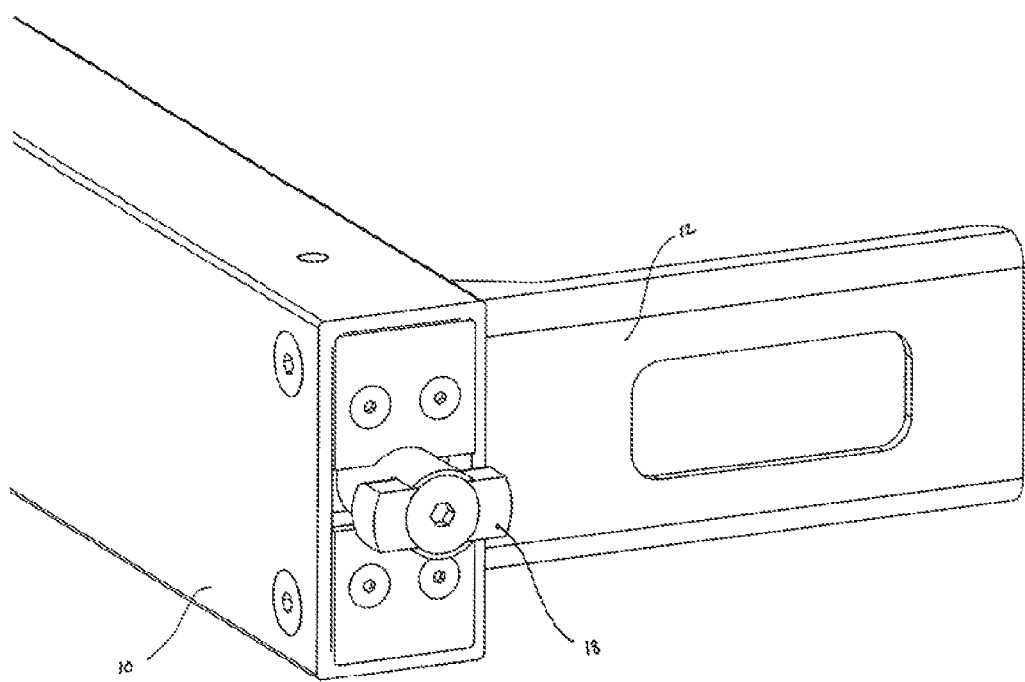
FIG. 3 shows partial oblique view of an extending feature of the joining mechanism in accordance with this disclosure.
Figure 4:
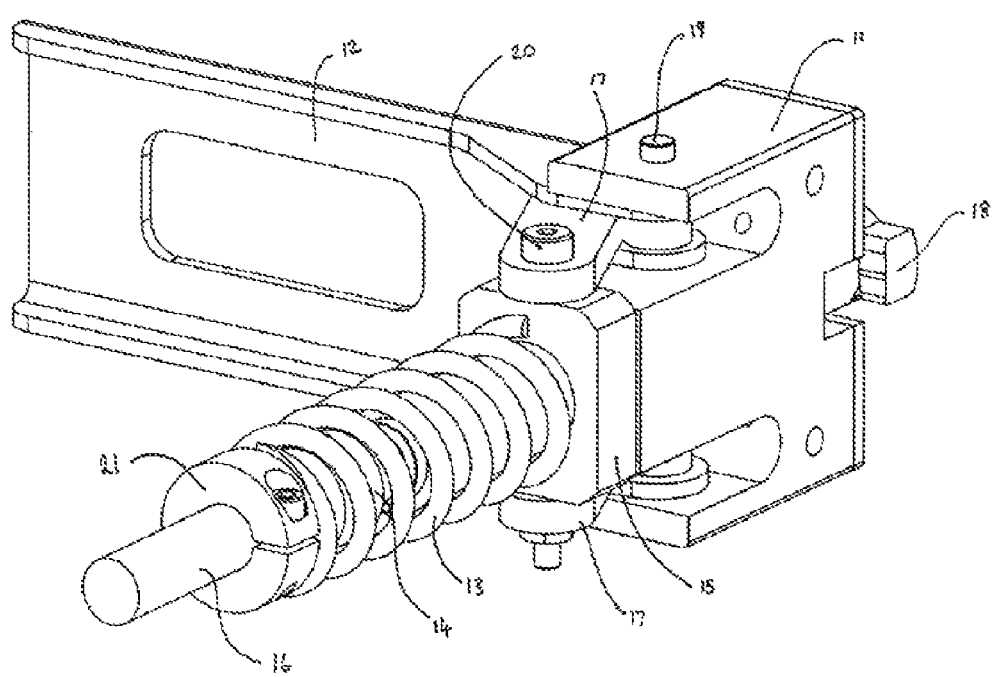
FIG. 4 shows an oblique view of coupling mechanism in accordance with this disclosure.

FIG. 4 is a more detailed view of one embodiment of a joining mechanism in accordance with this disclosure. In FIG. 4, the handle 12 is linked to the plunger shaft 16 through links 17, a slider 15, a spring 13 and a collar 21 such that the T-Head 18 mounted on the end of the plunger shaft 16 extends when the handle 12 is opened as shown in FIG. 3, and retracts when the handle 12 is closed as shown in FIG. 1.

Figure 5:
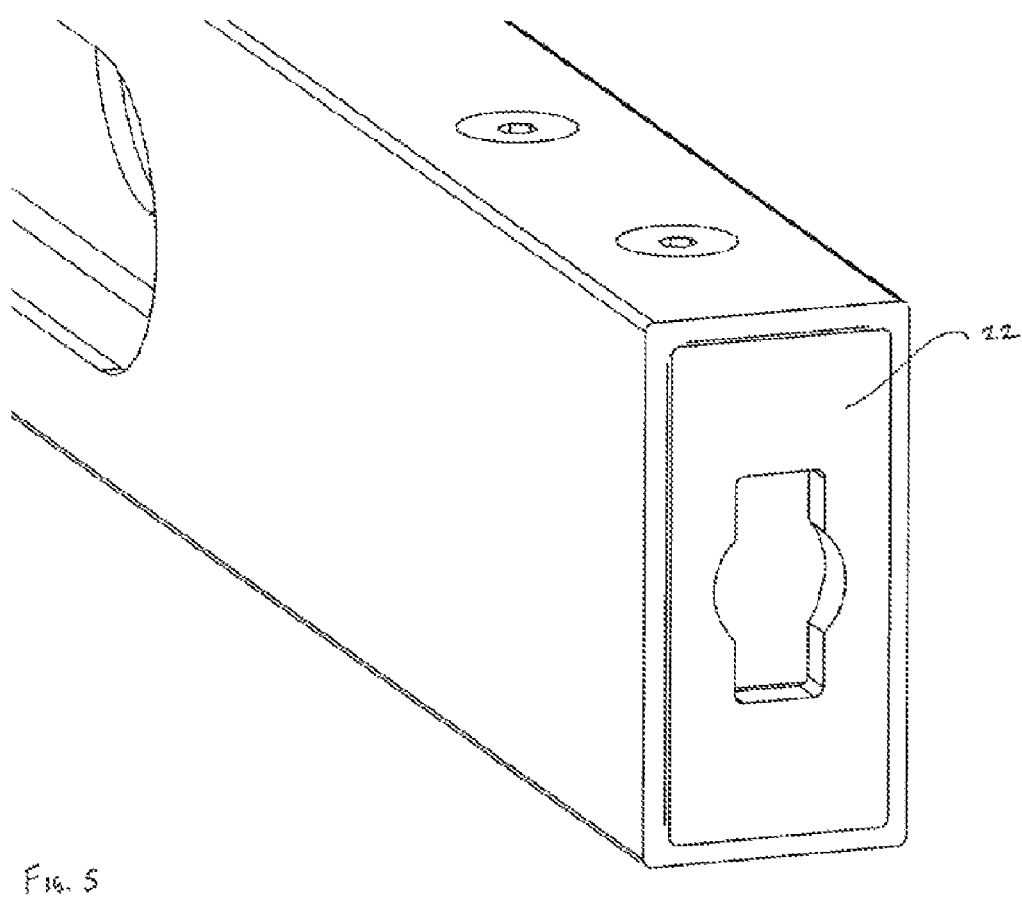
FIG. 5 shows a partial oblique view of a receiving end of a segment in accordance with this disclosure.

Referring now to FIG. 5, a more detailed view of a receiving end in accordance with this disclosure. A receiving end cap 22 is configured so that it can be mated to the extending coupling mechanism of an abutted section as shown in FIG. 6. The through hole in the receiving end cap 22 is shaped so as to receive the T-Head 18. The interior features of the receiving end cap 22 is configured such that the T-Head 18 in engaged and the spring 13 is compressed by the motion of the plunger shaft 16 mounted to the T-Head 18. Detent features of the receiving cap 22 corresponding to profile features of the T-Head 18 align the two abutted segment assemblies.

Referring back to FIG. 4, closing the handle 12 moves the coupled slider 15 so that it comes into contact with the end stop 14. The motion of the slider 15 is subsequently transmitted to the plunger shaft 16. Forces in the system allows the handle 12 to completely close in the manner of an over center clamping mechanism, creating a rigid stable connection between the abutted segments.

Opening the handle 12, causes the mechanism to release in a like manner so that segments can be separated. Once separated, closing the handle 12 causes the plunger shaft 16 and connected T-Head 18 to retract such that they do not protrude beyond the face of the extending coupling mechanism.

Figure 8:
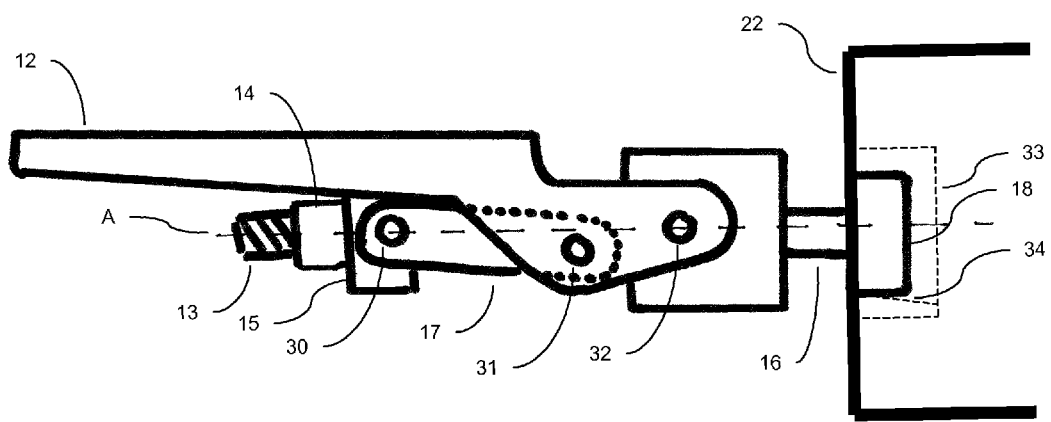
FIG. 8 is side cross-sectional view showing a more detailed view of the coupling mechanism in operation in accordance with this disclosure.

Referring now to FIG. 8, a side cross-sectional view of one embodiment the coupling mechanism is shown in a closed and locked position. When the handle 12 is closed, the slider 15 is stopped by the end cap 14 just prior to the pivot point 31 crossing over center of the axis A. As the handle 12 is further depressed, a tensional force will be created in the shaft 16 as pivot points 30 and 32 are forced apart. Simultaneously, a compressive force will be introduced into the links 17 as pivot point 31 nears axis A. After pivot point 31 passes over the center of axis A, the compressive and tensional forces will maintain the coupling mechanism in place in the arrangement shown in FIG. 8.

FIG. 8 also illustrates the end cap of member being coupled with the T-Head 18. As the units are rotated with respect to each other during the fastening process as illustrated in the sequence shown in FIG. 6, the T-Head 18 is rotated through a notched portion 34 of the end hole 33. This process will pull the T-Head 18 slightly further into the end hole 33, placing the spring 13 in moderate tension and effecting a pre-loading tension that will temporarily hold together and align the two segments being joined. This result in a much more sure and convenient joining process when compared to tools of the prior art.

As will now be appreciated, a new and novel tool for providing a useful edge reference for common construction tasks has been disclosed. This tool provides for a useful continuous reference edge over extended distances through adjoining segments. Each segment is suitably compact to be easy stowed. The segments are useful individually. The segments can be joined to extend tool to lengths useful in common construction tasks.

It is contemplated that alternate embodiments are possible that provide additional benefits. For example, the tool may provide for alternate section profiles, dimensions, or clamping means, and calibration means.

The tool may be configured to provide features for a variety of accessories, including but not limited to level inserts, handle inserts, clamp accessories, platforms for supporting other tools, end caps for segments, angle connections to couple segments, soft bumper accessories, saw guide features bracing supports, and alternative T-nut slot configurations.

While embodiments and applications of this invention have been shown and described, it will now be apparent to those skilled in the art having the benefit of this disclosure that many more modifications than mentioned above are possible without departing from the inventive concepts disclosed herein.

We claim:

1. A modular edge reference tool comprising:
    a first segment of the edge reference tool defining a longitudinal axis and a reference edge and having a extending end;
    a second segment of the edge reference tool defining a longitudinal axis and reference edge and having a receptacle end; and
    a coupling mechanism including a first component mounted within the extending end of the first segment and a second component mounted within the receptacle end of the second segment, wherein the coupling mechanism couples the extending end of the first segment to the receptacle end of the second segment;
    wherein the first component of the coupling mechanism includes a shaft substantially collinear to and positioned along the longitudinal axis of the first segment, wherein the shaft includes an external geometry that extends from the extending end in a first position, retracts to be flush with the extending end in a second position, and retracts to be in a position in between the first and second position when engaged to the second component in a third position, and a spring that provides a bias on the shaft to be flush with the extending end in the second and third positions;
    wherein the second component of the coupling mechanism includes a hole substantially collinear to the longitudinal axis of the second segment, wherein the hole includes an entrance geometry that allows the hole to receive the shaft of the first component in the first position when the second segment is offset 90 degrees along the longitudinal axis from the first segment, and wherein the hole includes internal geometry that subsequently engages the external geometry of the shaft and moves the shaft deeper into the hole upon a 90 degree rotation of the second segment, upon which the spring provides a force against the movement, wherein the external geometry of the shaft, the internal geometry of the hole, and the spring force cooperate to align the first and second segments, and wherein retraction of the shaft to the third position provides further spring force to couple the first and second segments.

2. The modular edge reference tool of claim 1, wherein the first component of the coupling mechanism further includes a translator with a locked and an unlocked position, wherein movement from the locked position to the unlocked position extends the shaft to the first position and movement from the unlocked position to the locked position retracts the shaft to one of the second position and the third position.

3. The modular edge reference tool of claim 2, wherein the translator includes a stationary component coupled to the first segment, a linkage coupled to the stationary component and the shaft, and a rotatable handle that is coupled to the linkage, wherein the linkage translates rotation of the handle between the locked and the unlocked positions to movement of the shaft between the first, second, and third positions.

4. The modular edge reference tool of claim 3, wherein the linkage and the rotatable handle are arranged in an over center clamping mechanism in the locked position.

5. The modular edge reference tool of claim 3, wherein the translator includes a slider coupled to the linkage and to the shaft, wherein the linkage translates rotation of the handle between the locked and unlocked positions to movement of the slider between a locked slider position and an unlocked slider position, and wherein movement of the slider from the locked slider position to the unlocked slider position extends the shaft to the first position and movement from the unlocked slider position to the locked slider position retracts the shaft to one of the second position and the third position.

6. The modular edge reference tool of claim 5, wherein the slider is coupled to the shaft through the spring, and wherein the spring provides a bias on the shaft to be flush with the end surface in the second and third positions by providing a bias to maintain the slider at a location along the shaft.

7. The modular edge reference tool of claim 1, wherein the first segment further includes a receptacle end opposite the extending end of the first segment and the second segment further includes an extending end opposite the receptacle end of the second segment.

8. The modular edge reference tool of claim 1, wherein the coupled first and second segments cooperate to form a continuous reference edge.

9. The modular edge reference tool of claim 1, wherein the spring is a compression spring.

10. The modular edge reference tool of claim 1, wherein the first segment is of a generally rectangular shape formed about the longitudinal axis.

11. The modular edge reference tool of claim 10, wherein the extending end includes a niche geometry located along the longitudinal axis and the external geometry of the shaft includes flush geometry that, when the shaft is in the second position, the extending end is substantially planar and includes four reference edges.

12. The modular edge reference tool of claim 1, wherein the first segment includes a main face that includes receiving geometry for accessories.

13. The modular edge reference tool of claim 12, wherein the receiving geometry for accessories includes a feature selected from the group consisting of: a cutout and a fastener.

14. The modular edge reference tool of claim 1, wherein the external geometry on the shaft is of a substantially rectangular shape including two main faces and two side faces, wherein the two main faces are arranged perpendicular to the longitudinal axis.

15. The modular edge reference tool of claim 14, wherein the entrance geometry is of a substantially identical shape as a cross section of the external geometry on the shaft when rotated 90 degrees along the longitudinal axis.

16. The modular edge reference tool of claim 14, wherein the internal geometry of the hole includes a notch that engages the substantially rectangular geometry of the shaft to move the shaft deeper into the hole upon a 90 degree rotation of the second segment.

17. A method for engaging segments of a modular edge reference tool comprising:
providing a coupling mechanism with a first component including an external geometry that extends along a longitudinal axis and a second component including an entrance geometry that receives the extending first component and an internal geometry that engages the external geometry of the first component;
providing a first segment with an extending end;
providing a second segment with a receptacle end;
embedding the first component into the extending end of the first segment wherein the external geometry extends from the extending end in a first position, retracts to be flush with the extending end in a second position, and retracts to be in a position in between the first and second position when engaged to the second component in a third position;
embedding the second component into the receptacle end of the second segment;
offsetting the second component 90 degrees along the longitudinal axis from the first component;
extending the geometry of the first component to the first position and inserting the extended first component into the second component;
rotating the second component 90 degrees and allowing the external geometry of the first component and the internal geometry of the second component to engage and align the first and second segments; and retracting the geometry of the first component to the third position to further engage and align the first and second segments.

18. The method of claim 17, further including the step of providing a spring bias on the geometry of the first component to be flush with the end surface in the second and third positions.

19. A modular edge reference tool comprising:
a first segment having a generally rectangular shape formed about a longitudinal axis and having an extending end and a receptacle end; and
a second segment substantially identical to the first segment;
a coupling mechanism including a first component mounted within the extending end and a second component mounted within the receptacle end, wherein the coupling mechanism couples the extending end of the first segment to the receptacle end of the second segment;
wherein the first component of the coupling mechanism includes:
   a. a relatively stationary component fixedly coupled to the first segment that includes a first face that includes a niche geometry and is perpendicular to the longitudinal axis and forms the end face of the extending end, a second face opposite the first face, and a first bore substantially collinear to the longitudinal axis,
   b. a slider that includes a stop face perpendicular to the longitudinal axis, a spring face opposite to the stop face, and a second bore substantially collinear to the longitudinal axis that travels along the longitudinal axis,
   c. a shaft substantially collinear to the longitudinal axis that is slidably coupled to the first and second bores that includes a first end that extends through the first bore beyond the first face and a second end that extends through the second bore and beyond the spring face, wherein the first end includes a geometry that engages the niche of the first face and stops the first end from sliding past the first face toward the second face,
   d. a spring coupled to the spring face of the slider and the second end of the spring that provides a bias to maintain the slider at a location along the shaft,
   e. a linkage coupled to the stationary component and the slider, and
   f. a handle coupled to the linkage,
wherein a rotation of the handle from a first position to a second position causes the slider and the shaft to travel along the longitudinal axis such that stop face approaches the second face and the first end of the shaft extends outward from the first face until the stop face contacts the second face, and wherein rotation of the handle from the second position to the first position causes the slider and the shaft to travel along the longitudinal axis in the opposite direction until the shaft is engaged, upon which the slider moves relative to the shaft and the spring provides a force against the movement, and wherein the arrangement of the linkage in the first position of the handle cooperates with the spring force to substantially maintain a relative position between the stationary component, the slider, the shaft, the spring, the linkage, and the handle; and
wherein the second component of the coupling mechanism includes a hole substantially collinear to the longitudinal axis that includes an entrance geometry that allows the hole to receive an extended first end of the shaft of the first segment when the second segment is offset 90 degrees along the longitudinal axis from the first segment and wherein the hole includes internal geometry that subsequently engages the geometry of the first end of the shaft and moves the first end of the shaft deeper into the hole upon a 90 degree rotation of the second segment, upon which the spring provides a force against the movement, wherein the geometry on the first end, the internal geometry of the hole, and the spring force cooperate to align the first and second segments, and wherein rotation of the handle to the first position provides further spring force to couple the first and second segments.

* * * * *